Jan. 2, 1923.

T. R. BULLOCK.
BILLIARD TABLE CUSHION.
FILED JUNE 12, 1920.

1,441,060.

Inventor
Thomas R. Bullock,
By Knight Bros.
Attorneys

Witness

Patented Jan. 2, 1923.

1,441,060

UNITED STATES PATENT OFFICE.

THOMAS R. BULLOCK, OF PROVIDENCE, RHODE ISLAND.

BILLIARD-TABLE CUSHION.

Application filed June 12, 1920. Serial No. 388,507.

*To all whom it may concern:*

Be it known that I, THOMAS R. BULLOCK, a citizen of the United States, and a resident of Providence, in the county of Providence and State of Rhode Island, have invented certain new and useful Improvements in Billiard-Table Cushions, of which the following is a specification.

My invention relates to billiard table cushions, and more particularly, to a cushion comprising a relatively small strip of rubber, reenforced by metallic fingers embedded therein.

It is an object of my invention to provide a billiard cushion in which the various disadvantages present in the several types of cushions now universally in use are eliminated. The present invention is designed as an improvement over the cushion upon which I received Patent No. 613,407, on November 1, 1898.

This present invention contemplates the provision of a relatively narrow strip of rubber disposed at the point of contact of the billard ball, this strip of rubbed having embedded therein, strips or banks of spring fingers which are adapted to co-operate with the strip of rubber to provide the proper resilience to the cushion.

These banks or strips of spring fingers are so formed that they function as individual spring members, but are formed in strips to enable them to be conveniently and expeditiously inserted in the cushion member and assembled with the appurtenant members of the billiard table.

Figure 1:
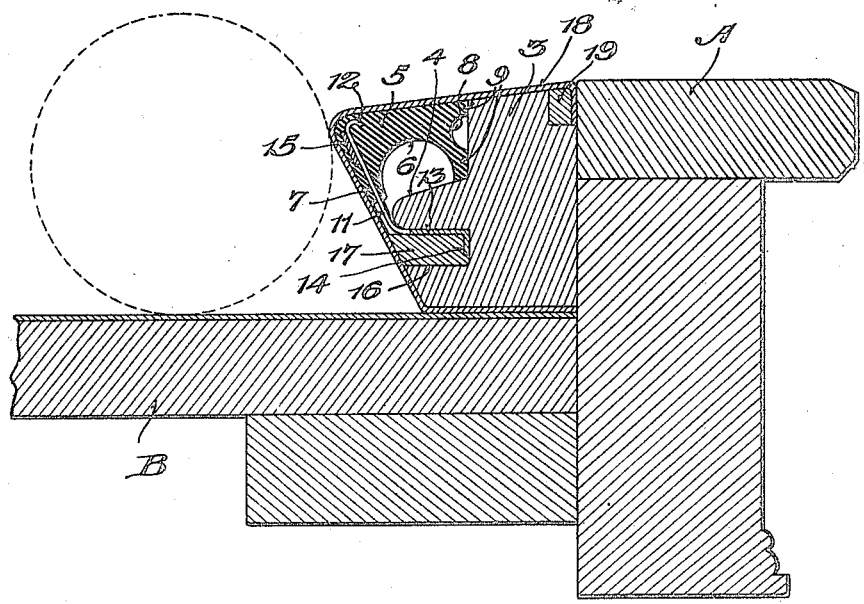
Figure 2:
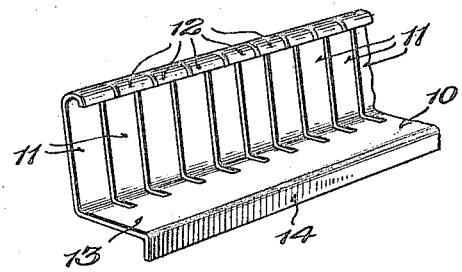

Various other objects will appear more fully hereinafter in the specification and drawings, in which:

Fig. 1 is a sectional view showing my improved cushion in place upon a billiard table; and, Fig. 2 is a detailed perspective view of a section of the strip of metallic fingers.

In the drawings the letter A indicates the usual cushion frame or rail, and B the slate bed. The cushion comprises a cushion block 3 of wood, or any other suitable material, having its outer edge cut away as at 4 for the reception of the rubber section 5 of the cushion member.

The cross-sectional shape of the rubber section 5 is substantially as illustrated in Fig. 1, and is cut away as shown at 6 to provide a relatively weakened downwardly projecting edge 7. The rearward side of the rubber section is cut away as at 8 so as to facilitate the seating of the strip 5 against the block 3. By recessing section 5, seats 9 are provided which, as illustrated in Fig. 1, abut snugly against the inner face of the block 3.

By reference to Fig. 2, the construction of the spring metal members will be clearly apparent. These spring metal members are formed by providing a strip 10, from which upwardly projecting fingers 11 extend. These fingers 11 have their upper ends bent inwardly and downwardly, as at 12. The strip 10 is provided with a horizontal integral portion 13, and a downwardly projecting edge 14.

In forming the cushion member, the strip 10 containing the multiplicity of spring fingers 11 is adapted to be embedded in the rubber section as clearly illustrated in Fig. 1, the spring fingers being contained in the rubber member adjacent the inner side thereof. The curved ends 12 of the spring fingers will assist in retaining the same embedded in the rubber section 5 by preventing independent vertical displacement thereof. It should also be noted that the curved end 12 is positioned approximately adjacent the point of contact of the billiard ball. A strip of canvas or other suitable reinforcing material 15 is embedded in the rubber section 5 between the upper end of the spring fingers 11 and the outer edge of the cushion, adjacent the contacting edge thereof.

In assembling the device, the rubber sections 5 are placed in the cutout portion 4 of the cushion block 3 with the horizontal portion 13 projecting in the recess 16 formed in the block 3. The retaining strip 17 is forced in the recess 16 to securely retain the lower end of the metallic strips in place. It should be noted that the metallic members are so disposed with reference to the cutaway portion 16 in the block 3, that in effect there is provided only a multiplicity of spring fingers. This is so by reason of the fact that the bifurcations in the metal strip which forms the fingers 11, start at a point well within the recess 16, and the resulting resiliency afforded the rubber section 5 is that of the multiplicity of separate spring metal fingers, rather than a continuous metal strip.

The usual felt covering 18 is provided and held in place at the upper side of the cushion by a retaining strip 19, and secured in the usual manner beneath the cushion block 3.

From the foregoing it will be seen that I have provided a cushion in which the advantages of a rubber cushion are present, and in which numerous disadvantages thereof are absent. By cutting away the underside of the rubber 5, the same is properly weakened to allow the spring metal fingers to function. I have found that the best advantages result in a cushion of this type with the provision of resilient spring metal fingers, but, I have also found that it is impossible to retain these fingers in place, and difficult to properly position them when they are independent of one another. In the structure hereinbefore described, I am enabled to retain the advantages of these independent spring fingers, and at the same time facilitate the handling of the same. By forming these metal fingers in banks or strips, they may be easily molded with the sections 5 of rubber, and the whole structure conveniently secured upon the cushion block 3. As hereinbefore stated, the spring fingers 11 commence at a point sufficiently within the recess to preserve their independent qualities, and at the same time be retained in proper relation because of the fact that they are integral with one another.

It should also be noted that by so constructing my cushion, a uniform resilience is insured, by reason of the spring fingers. A proper angle to the cushion is also always present. The life of the cushion is consequently prolonged considerably, inasmuch as, although the rubber section may become dead, the springs will impart thereto the proper degree of resilience and thereby continue the life of the cushion. The various types of cushion which rely to a great extent upon the rubber for the resilient qualities of the cushion, soon become hard and dry and thereby unavailable for use. These obvious disadvantages are completely overcome in the structure described hereinbefore.

Various modifications may be made in my invention without departing from the spirit or scope thereof, and it should be understood that the specific structure illustrated in the drawings discloses only one embodiment thereof.

Having thus described my invention, what I claim is:

Claims:

1. In a billiard table cushion, the combination with a cushion block of a relatively small rubber section, a metallic resilient re-inforcing member for said rubber section, said metallic member being bifurcated to form a multiplicity of fingers, said fingers being inclined to correspond to the active face of said rubber section, said fingers being provided with bent ends, said fingers being adapted to be moulded in said rubber section and means for rigidly securing said metallic member upon said cushion block along its integral portion so that said fingers function as a multiplicity of independent spring fingers.

2. A cushion for billiard tables and the like comprising a recessed wooden cushion block, a relatively small strip of rubber disposed upon said block in said recess, a metallic member for resiliently re-inforcing said rubber strip, said metallic member being bifurcated to form a bank of spring fingers, the spring fingers thus formed projecting upwardly and being embedded in said rubber strip adjacent the active face of said rubber strip, the integral portion of said metallic member being bent to form a horizontal surface and a down-turned edge, a second recess formed in said block, the integral portion of said metallic member adapted to be disposed within said second recess and a retaining strip adapted to be forced into said second recess for engaging the integral portion of said metallic strip.

3. A cushion for billiard tables and the like which consists of a block provided with a cutaway portion, a rubber section adapted to be inserted in said cutaway portion, said rubber section being recessed upon its underside to provide a comparatively weakened face, a spring metal strip formed with a multiplicity of upwardly projecting fingers, a horizontal integral surface and a down-turned edge, said fingers being adapted to be molded into the weakened face of said rubber section, said block being formed with a recess for receiving the free portion of said metal member, and a retaining strip for securing said metal strip in place, as and for the purpose set forth.

THOMAS R. BULLOCK.